US 8,842,796 B2

(12) United States Patent
Aleshin et al.

(10) Patent No.: US 8,842,796 B2
(45) Date of Patent: Sep. 23, 2014

(54) NUCLEAR FUEL ROD PELLET STACK INSPECTION

(75) Inventors: Yuriy Aleshin, Columbia, SC (US); David B. Mitchell, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 639 days.

(21) Appl. No.: 13/302,104

(22) Filed: Nov. 22, 2011

(65) Prior Publication Data
US 2013/0129029 A1    May 23, 2013

(51) Int. Cl.
*G21C 17/06* (2006.01)
(52) U.S. Cl.
CPC ................................. *G21C 17/06* (2013.01)
USPC .......................................................... 376/247
(58) Field of Classification Search
USPC .......................................................... 376/247
See application file for complete search history.

(56) References Cited

U.S. PATENT DOCUMENTS

| | | | | |
|---|---|---|---|---|
| 3,983,741 A * | 10/1976 | Honig et al. | ...................... | 374/5 |
| 4,079,620 A * | 3/1978 | Jester et al. | ...................... | 374/5 |
| 4,978,495 A * | 12/1990 | Ahmed | ......................... | 376/261 |
| 5,602,885 A * | 2/1997 | Ahmed et al. | ................. | 376/248 |
| 6,000,844 A * | 12/1999 | Cramer et al. | .................... | 374/5 |
| 2003/0193987 A1* | 10/2003 | Zalameda et al. | ................. | 374/5 |
| 2007/0201608 A1* | 8/2007 | Model et al. | ................... | 376/417 |

\* cited by examiner

*Primary Examiner* — Timothy A Brainard
(74) *Attorney, Agent, or Firm* — Joseph C. Spadacene; Westinghouse Electric Company LLC

(57) ABSTRACT

A method of detecting defects in nuclear fuel within a fuel rod that first heats the fuel rod to a temperature substantially above the ambient temperature. The surface temperature of the fuel rod cladding is then monitored as the fuel rod is allowed to cool. Variations in the temperature measured over the surface is then noted as an indication of defects.

12 Claims, 8 Drawing Sheets

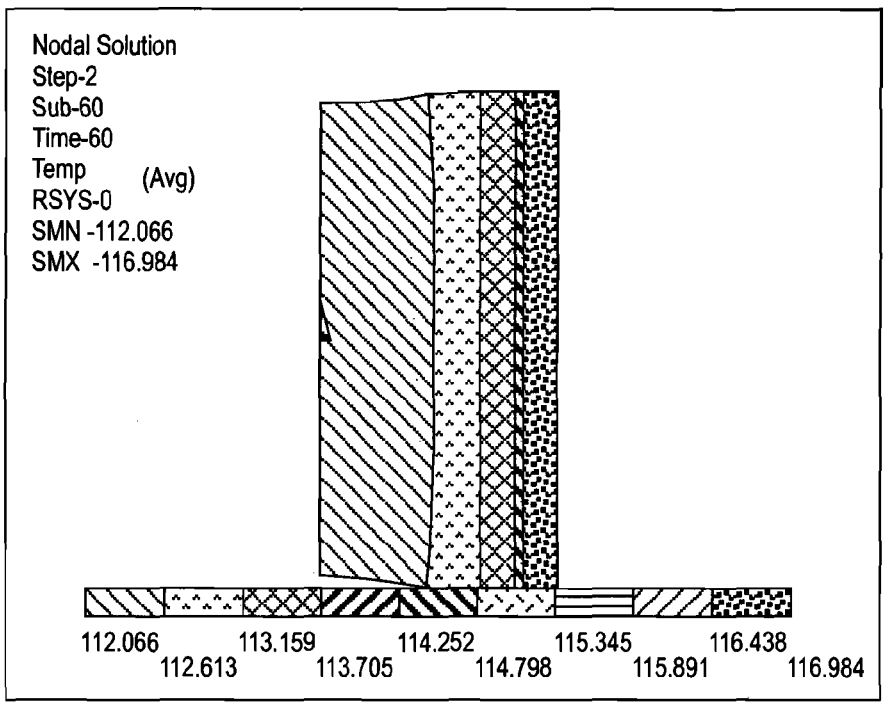
FIG. 4A  Time 60 Sec
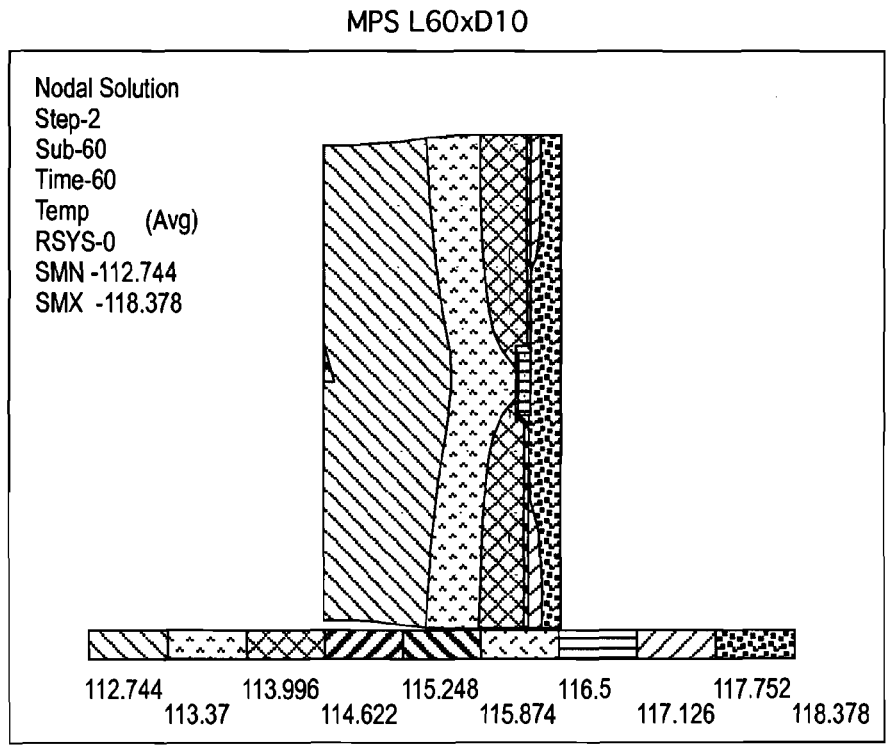
FIG. 4B  Time 60 Sec

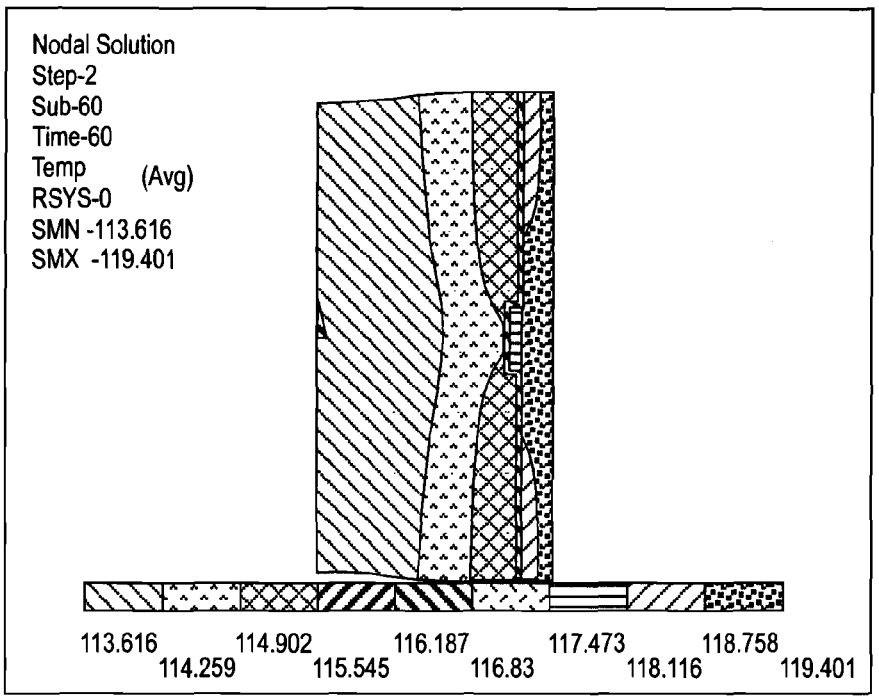
FIG. 4C  Time 60 Sec
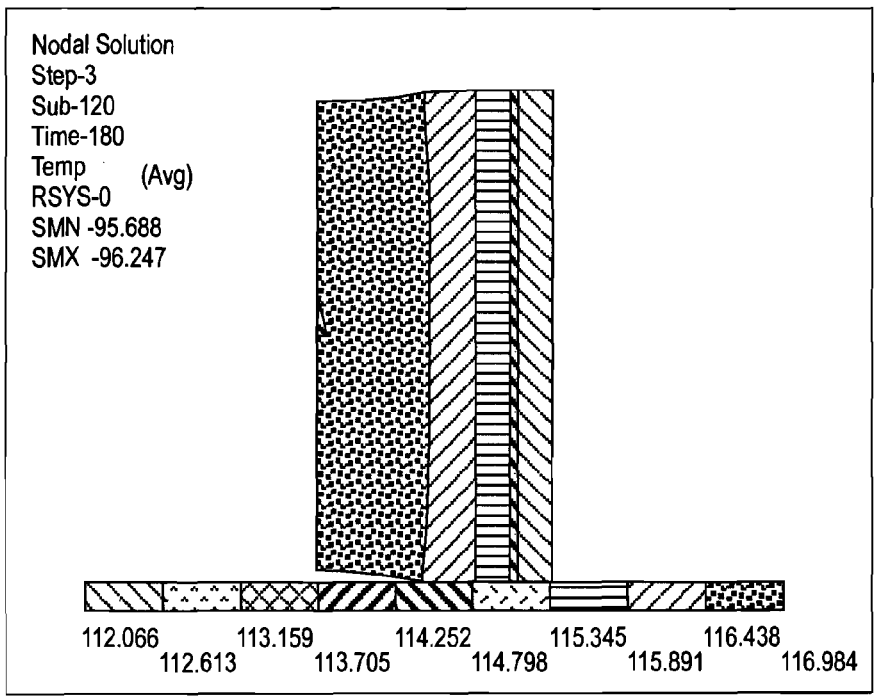
FIG. 4D  Time 180 Sec

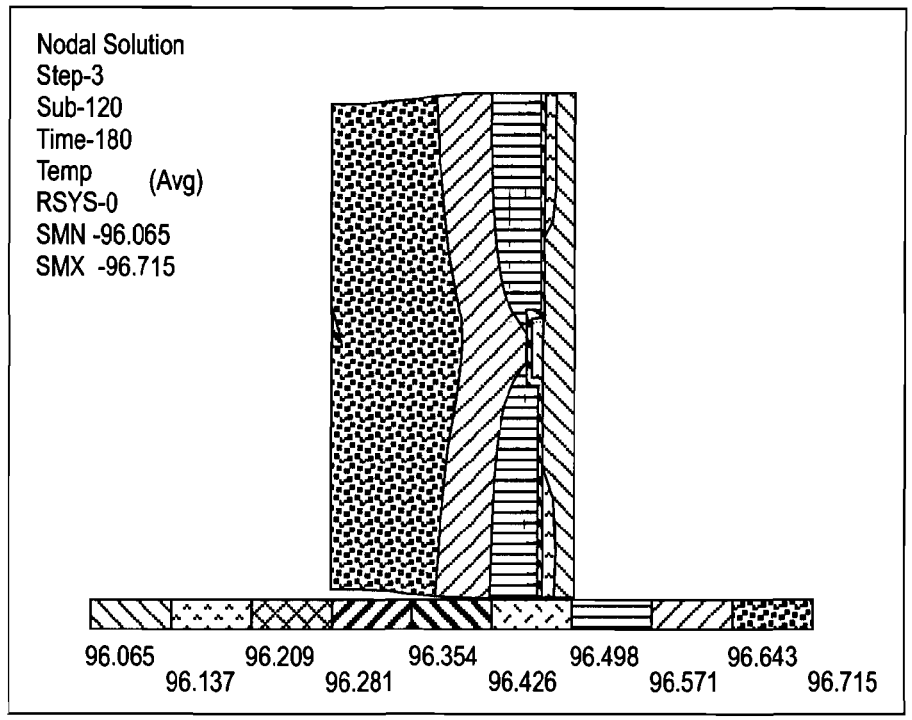
FIG. 4E  Time 180 Sec
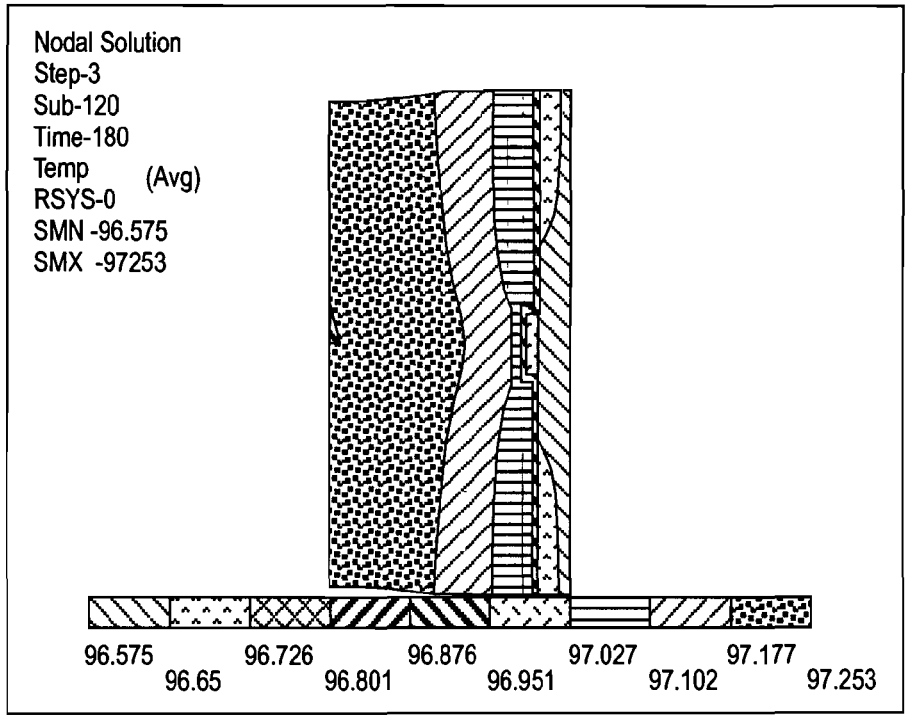
FIG. 4F  Time 180 Sec

NUCLEAR FUEL ROD PELLET STACK INSPECTION

BACKGROUND

1. Field

The present invention relates generally to the inspection of nuclear fuel rods and, more particularly, to the inspection of a nuclear fuel pellet stack within a hermetically sealed fuel rod cladding to detect missing pellet surfaces and pellet-to-pellet gaps.

2. Related Art

The large nuclear reactors utilized for power generation employ an array of a large number fuel rods containing nuclear fuel. Each rod comprises a metal tube or a sheath which may be from 8 to 15 feet (2.4-4.6 m) long and up to one-half inch (1.27 cm) in diameter, and which contains a stack of cylindrical fuel pellets of suitable fissionable material such as uranium oxide. The upper end of the tube is empty of fuel pellets and forms a plenum for a gas or other fluid under substantial pressure which fills the top of the rod and also a small clearance space around the fuel pellets. The fuel rods are supported in parallel groups in fuel assemblies which may typically contain upwards of 300 fuel rods, and the complete nuclear reactor is made up of a large number of these fuel assemblies arranged in a suitable configuration in an active core.

The metal tubes of the fuel rods, also known as cladding, constitute the primary containment boundary for the radioactive nuclear fuel, and inspection of the internal components of the rod that can affect the rod's integrity is of primary importance. In the manufacture of the fuel rods, the tubing itself and the end cap welds are carefully inspected and helium leak tested. Since a nuclear reactor may contain upwards of 40,000 fuel rods, a probability exists that some number of defective rods will be present even with a highly effective manufacturing quality control program. It is also desirable to inspect the fully loaded fuel pellet stack for defects such as missing pellet surfaces and pellet-to-pellet gaps which can ultimately compromise the cladding's integrity or affect core performance. The temperature differences on the outer cladding surface of an assembled fuel rod can result from differences in the radial thermal resistance between the cladding inside diameter and the fuel pellet outer surface due to a missing pellet surface or a pellet-to-pellet gap. It is important to detect conditions such as this that might ultimately result in breaches of the cladding which could lead to fission products leaking into the reactor coolant and can result in many conditions that increase operating costs. These conditions include: (1) high radiation readings in the primary cooling system; (2) increased volume of liquid radioactive waste; (3) increased volume of solid radioactive waste due to more frequent demineralizer bed replacement; (4) increased costs for disposal of spent fuel assemblies due to special handling and additional decontamination; and (5) increased exposure to personnel. These increased costs outweigh the costs incurred by testing assemblies. Once identified, a leaking fuel rod may be extracted from the fuel assembly and replaced with a dummy rod to allow the eventual reload of the assembly in the core. To the extent failure mechanisms can be located in advance of placing the fuel assemblies in the core, the costs of replacing defective rods can be minimized.

Accordingly, it is an object of this invention to provide a means of nondestructively inspecting a fuel pellet stack sealed within the cladding of a nuclear fuel rod.

Further, it is an object of this invention to provide such an inspection method that can be performed efficiently, with minimal effort and expense.

SUMMARY

These and other objects are achieved by the inventions claimed hereafter which provide a method of detecting defects in nuclear fuel within a fuel rod cladding which include the step of heating at least a portion of the fuel rod to a temperature substantially above the ambient temperature, preferably in a range of between 80 to 120 degrees centigrade. The temperature over the surface of the cladding is then measured as the cladding is cooled, preferably in an ambient environment. Variations are then noted in the temperature measured over the surface of the cladding to determine defects in the fuel stack.

In one embodiment, the heating step is performed in a soaking chamber that covers at least a portion of the fuel rod and preferably, the temperature is measured with an infrared receiver such as an infrared camera. Preferably, the fuel rod is rotated as it passes in front of the infrared camera.

In another embodiment, the method includes a second heating step after the initial heating step wherein the second heating step heats the surface of the rod for a time period substantially shorter than the initial heating step and before the measuring step. The second heating step may be performed by a radiant heat source, and desirably the rod is moved past the radiant heat source.

In still another embodiment, the measuring step is performed in a reduced pressure environment, i.e., below atmospheric pressure and desirably, the noting step occurs at approximately between 60 and 180 seconds after the heating step is completed.

BRIEF DESCRIPTION OF THE DRAWINGS

A further understanding of the invention can be gained from the following description of the preferred embodiments when read in conjunction with the accompanying drawings in which:

FIGS. 4A through 4F are graphical representations of the fuel rod temperature distribution of fuel rods exhibiting no missing pellet surface and two different missing pellet surface conditions measured 60 seconds and 180 seconds after the heating step described hereafter;

DESCRIPTION OF THE PREFERRED EMBODIMENT

Figure 1:
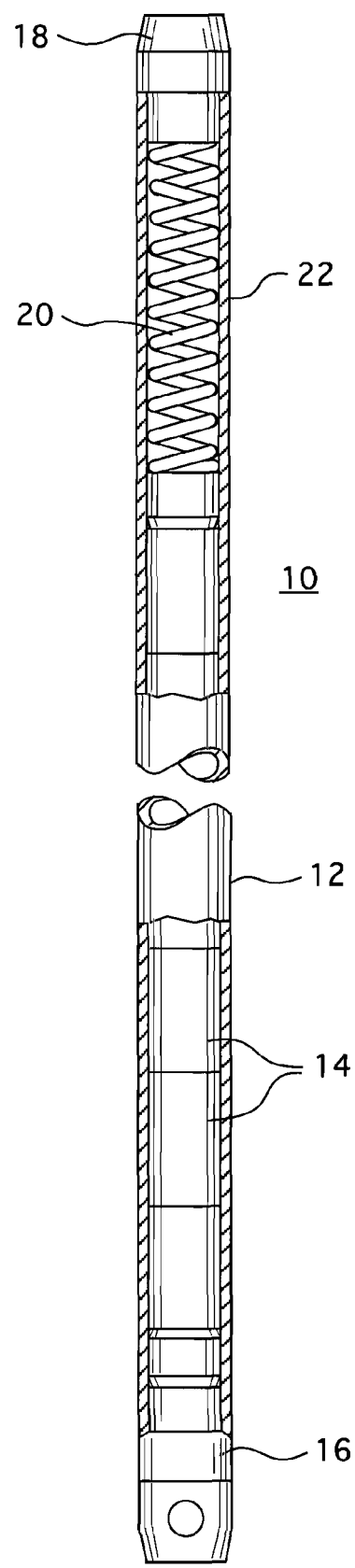
FIG. 1 is a sectional view of a typical nuclear fuel rod.

A typical nuclear fuel rod is shown by way of example in FIG. 1. The fuel rod 10 comprises a metal tubular cladding 12 of a suitable alloy such as Zircaloy capable of withstanding the severe conditions to which it is subjected during operation, and is usually of considerable length, such as from 8 to 15 feet (2.4-4.6 m) and a relatively small diameter which may be in the order of ½ inch (12.7 mm). The tube 12 is filled for most its length with nuclear fuel pellets 14 which may be made of uranium oxide or other suitable nuclear fuel, and which are of a diameter to fit closely within the tube 12 with a very small radial clearance. The tube 12 is closed at top and bottom by upper and lower end caps 18 and 16, respectively, which are welded in place to form a leak-tight closure. The fuel pellets 14 are disposed in a vertical column extending through most of the length of the tube 12 but with an empty space or plenum 22 at the top. A spring 20 is disposed in this plenum to hold the column of fuel pellets in position. The plenum in the top of the tube 12, and the small clearance between the pellets 14 and the tube 12, are filled with a fluid which is usually gas, and which usually will contain fission products during and after operation within the reactor. This fluid in the tube 12 is normally maintained under substantial pressure typically in the order of 100 to 300 psi (7-21 kg/cm$^2$) at the beginning of fuel assembly life (prior to operation within a reactor core) and further increases during operation as fission products are generated in the fuel.

As the fuel pellets 14 are loaded into the cladding 12, there may develop increased gaps between the pellets or missing pellet surfaces such as chips or scars which can affect the temperature distribution over the cladding and detract from the optimum performance of the fuel rod. Therefore, it is desirable to be able to inspect for such defects after the pellets have been loaded into the cladding and, preferably after the cladding has been sealed and pressurized. The embodiments set forth hereafter provide such an inspection technique that is performed by thermal imaging the outer cladding surface with an infrared camera and utilizes the temperature differences over the cladding to identify fuel stack defects. The temperature differences are set up as a result of the differences in the radial thermal resistance between the cladding inside diameter surface and the fuel pellet outer surface due to the missing pellet surfaces or pellet-to-pellet gaps.

Figure 2:
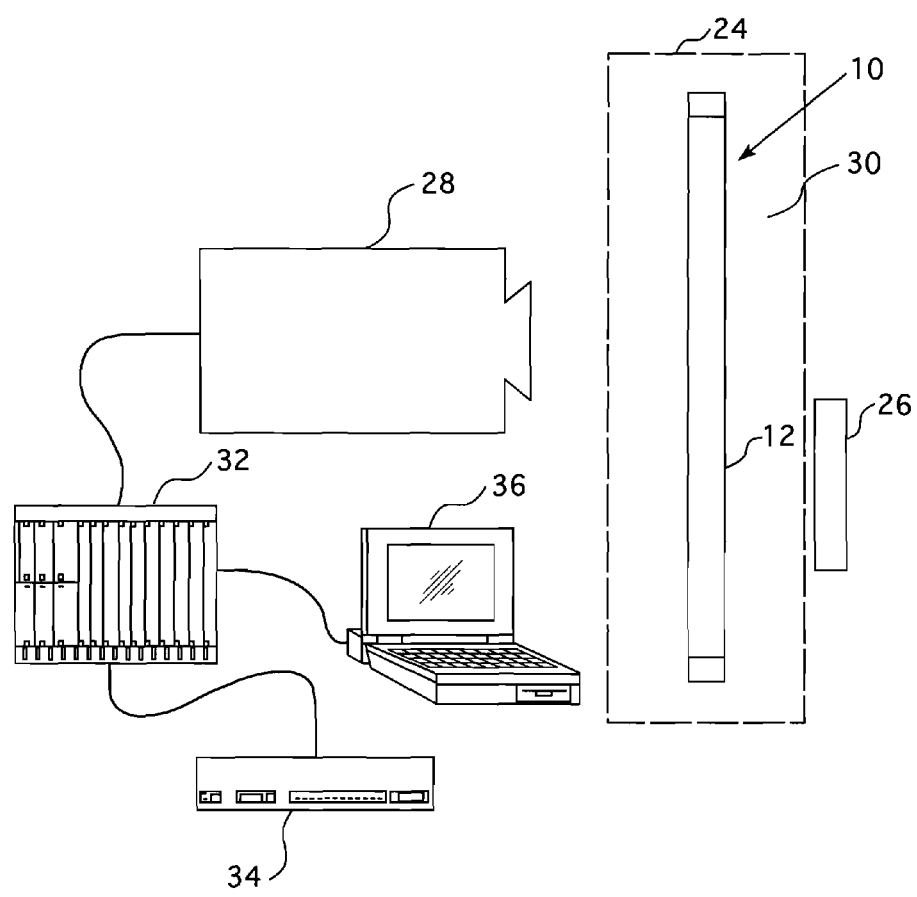
FIG. 2 is a schematic block diagram of a system which can be used to carry out the steps of the embodiments described hereafter.

FIG. 2 is a schematic illustration of some apparatus which may be employed in carrying out the steps of the methods claimed hereafter. In accordance with one embodiment, the fuel rod 10 is soaked at a given temperature preferably at or between 80 to 120° C. in a soaking chamber 24, preferably covering at least a portion of the fuel rod over which the fuel pellets extend or which is expected of having a defect. Then the fuel rod 10 is extracted from the soaking chamber 24 and the cladding surface 12 is heated for a short period of time of approximately 60 sec., while moving past a radiant heat source 26. Then the rod is moved while rotating past an infrared camera 28. Though not required, preferably the latter steps are conducted in a reduced pressure environment, i.e., below atmospheric pressure, to reduce the convective heat transfer. However, the clad temperature difference should be detectable for at least 2 min. at natural convection in air. The output of the infrared camera 28 can be operated upon by a processor 32 controlled by a computer 36 to establish a comparison of the temperature differences, and recorded by a recorder 34. The variable radial thermal resistance will affect heat transfer from the fuel pellets 14 to the cladding 12 resulting in cladding temperature differences on the outside surface of the cladding. The thermal image will be evaluated by the software in the computer 36 to account for pellet eccentric positioning and pellet missing surfaces within the cladding. Finite element analysis is used to provide the optimal soaking temperature as well inputs for software evaluation of the temperature data.

In an alternate embodiment, the fuel rod 10 may be soaked at a higher temperature up to 120° C. and then extracted from the soaking chamber and then moved while rotating past the infrared camera 28. Preferably, this is also done in a reduced pressure environment to reduce convective heat transfer.

Figure 3:
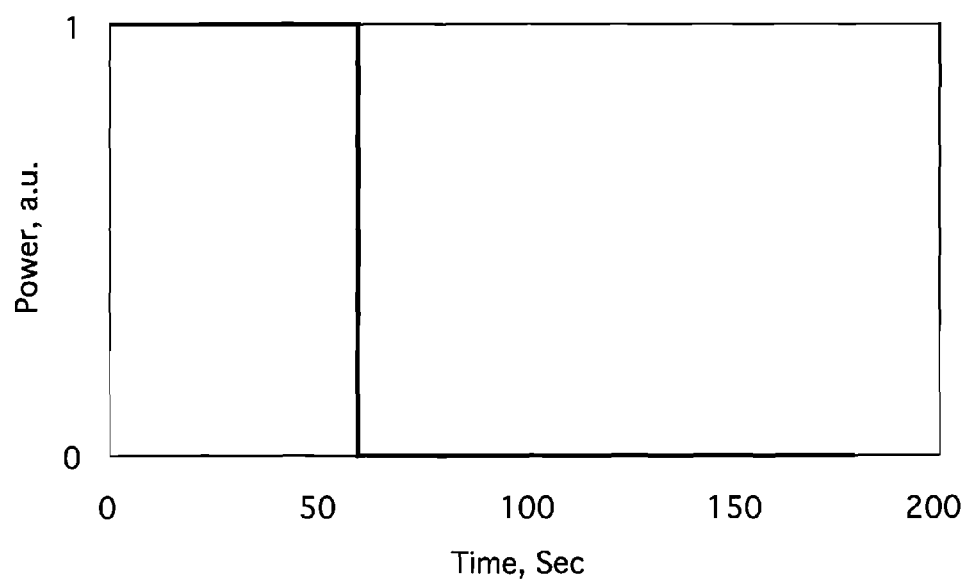
FIG. 3 is a graphical representation of the thermal image inspection duration.
Figure 5A:
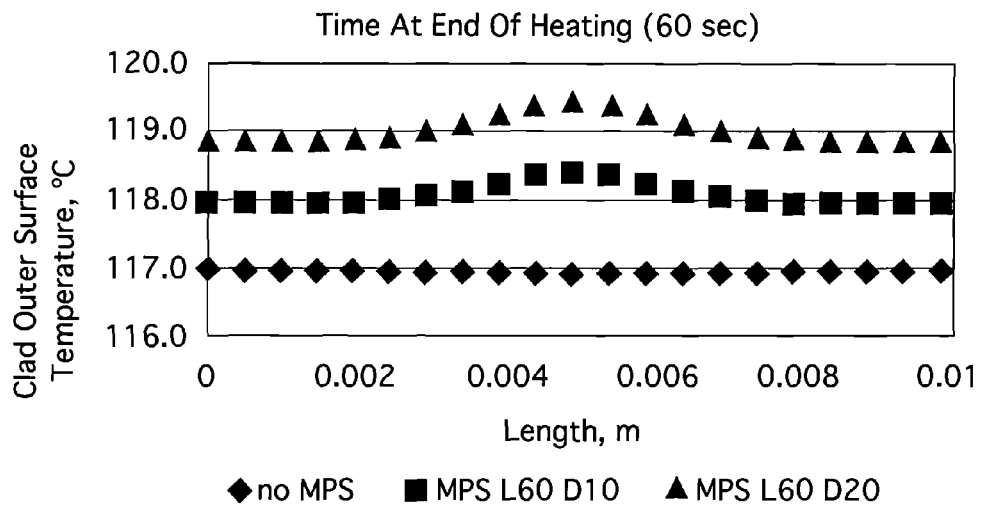
FIGS. 5A and 5B are graphical representations of the three missing pellet surface conditions illustrated in FIG. 4A through 4F taken at 60 seconds (FIG. 5A) and 180 seconds (FIG. 5B) from the end of the heating cycle.
Figure 5B:
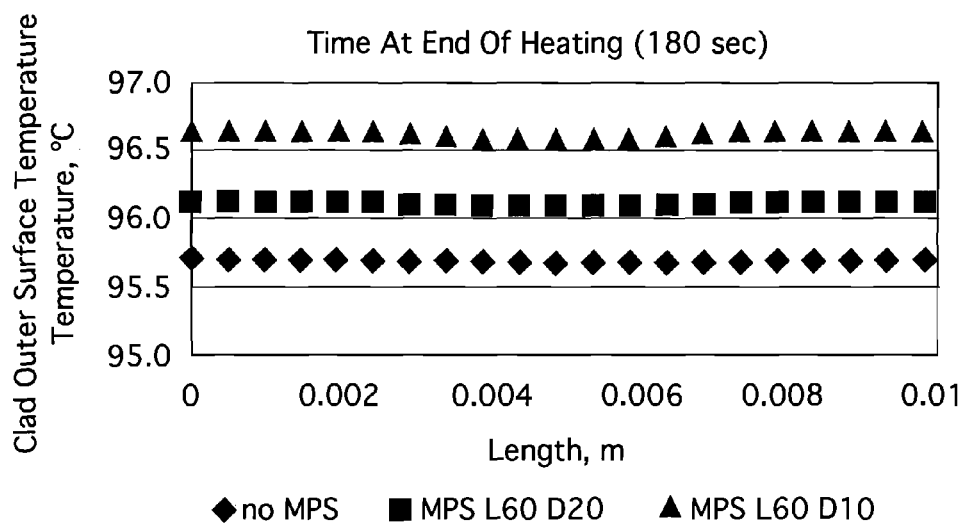

A proof of principle was conducted for the thermal image inspection method claimed hereafter using a transient finite element analysis of the fuel rod with a heat up time of 60 seconds and a cool down time of 120 seconds as figuratively illustrated in the graphical representation shown in FIG. 3. The power source is able to increase the fuel rod outer surface temperature by approximately 100° C. during the 60-second heat up time. Natural convection in air is used for the cool down part of the cycle. The fuel rod temperature distributions for a fuel rod with no defects, (FIGS. 4A and 4D), a fuel rod with a missing pellet surface length of 60 mils and a depth of 10 mils (FIGS. 4B and 4E) and a fuel rod with a missing pellet surface length of 60 mils and a depth of 20 mils (FIGS. 4C and 4F) at 60 seconds (FIGS. 4A-4C) and 180 seconds (FIG. 4D-4F) are graphically illustrated in FIGS. 4A-4F. The fuel rod surface temperature distributions at 60 seconds and 180 seconds are graphically illustrated in FIGS. 5A and 5B, respectively.

Figure 6:
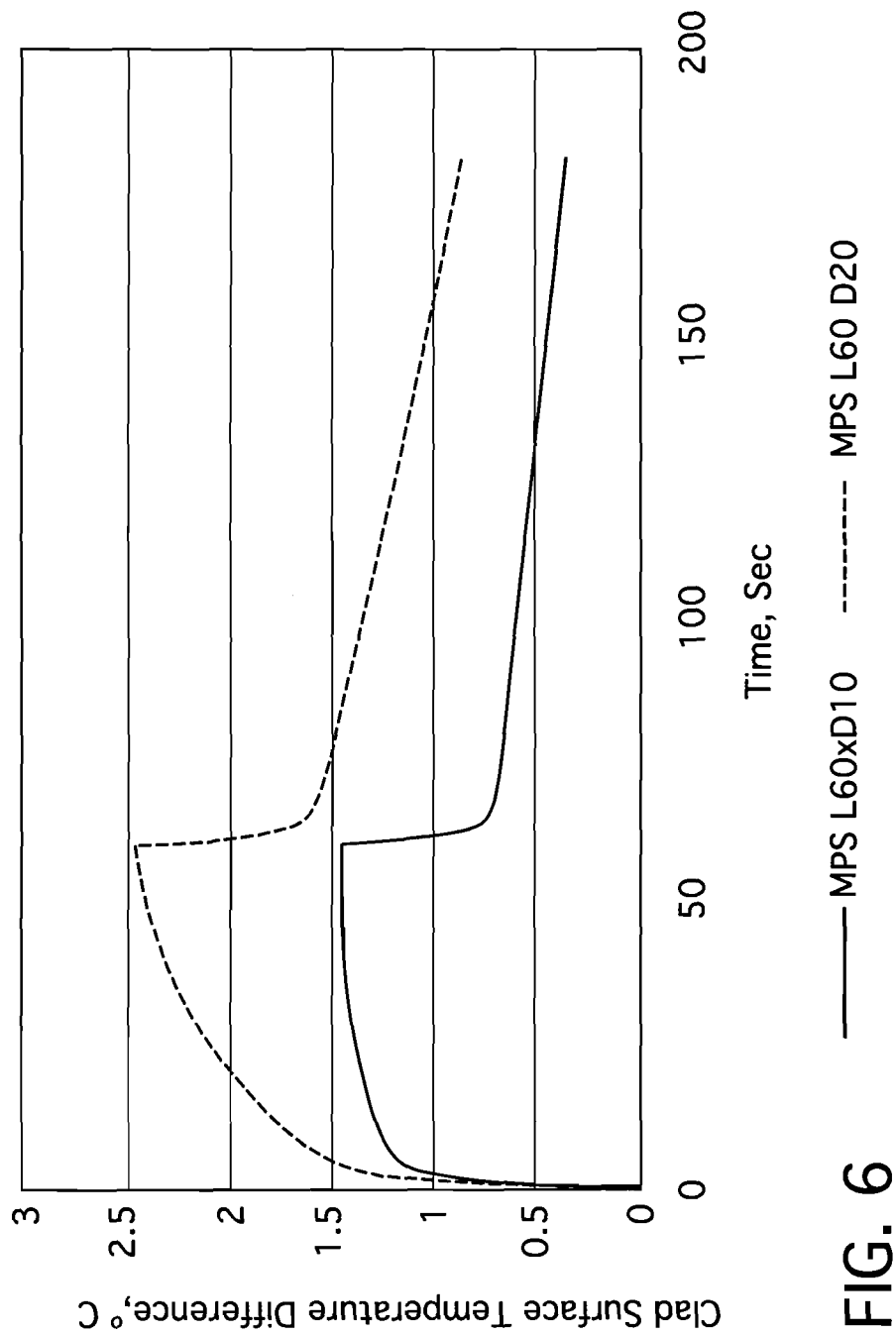
FIG. 6 is graphical representation of the fuel rod clad outer temperature differences relative to the no missing pellet surface fuel rod clad temperature noted during an inspection cycle for two different conditions of missing pellet surfaces.

The clad outer surface temperature differences relative to a fuel rod with no missing pellet surface and a fuel rod with a pellet stack defect are shown in FIG. 6. FIG. 6 shows the method's sensitivity to defect depth. The graph in FIG. 6 shows two areas along the cladding surrounding pellet defects of different depths relative to adjacent areas that surround no pellet defect. One defect is approximately 10 mils and results in and approximately 1.5° C. difference relative to the adjacent cladding area covering no defect. The second defect has a depth of approximately 20 mils and produces approximately a 1° C. difference. This difference can be easily detected by a modern thermal image device. Thus, the methods claimed herein provide a practical means of inspecting a nuclear fuel pellet stack in a sealed fuel rod for missing pellet surfaces and pellet-to-pellet gaps.

While specific embodiments of the invention have been described in detail, it will be appreciated by those skilled in the art that various modifications and alternatives to those details could be developed in light of the overall teachings of the disclosure. For example, it should be appreciated that this process could be performed continuously with the fuel rods passing through a heating zone with a velocity of, for example, approximately 10"/min and moving to a temperature detection zone where the temperature is monitored by one or more temperature detection devices such as cameras surrounding the rod. Accordingly, the particular embodiments disclosed are meant to be illustrative only and not limiting as to the scope of the invention which is to be given the full breadth of the appended claims and any and all equivalents thereof.

What is claimed is:

1. A method of detecting defects in nuclear fuel within a fuel rod comprising the steps of:
   heating the fuel rod to a temperature range substantially above an ambient temperature;
   measuring the temperature over a surface of the rod as the rod is allowed to cool; and
   noting over a preselected time period variations in the temperature decrease measured over the surface of the rod as the rod is allowed to cool.

2. The method of claim 1 wherein the heating step is performed soaking chamber.

3. The method of claim 1 wherein the heating step simultaneously heats substantially an entire area of a cladding of the rod that extends over a stack of fuel pellets within the rod, to a temperature in the range of 80 to 120 degrees centigrade.

4. The method of claim 1 wherein the fuel rod is allowed to cool substantially at the ambient temperature.

5. The method of claim 1 wherein the temperature is measured with an infrared receiver.

6. The method of claim 5 wherein the infrared receiver is an infrared camera.

7. The method of claim 5 including a step of rotating the fuel rod in front of the infrared receiver.

8. The method of claim 1 including a second heating step after the initial heating step and before the measuring step wherein the second heating step heats the surface of the rod for a time period substantially shorter than the initial heating step.

9. The method of claim 8 wherein the second heating step is performed by a radiant heat source.

10. The of claim 9 including a step of moving the rod past the radiant heat source.

11. The method of claim 1 wherein the measuring step is performed in a reduced pressure environment that is below atmospheric pressure.

12. The method of claim 1 wherein the noting step occurs at approximately at or between sixty and one hundred eighty seconds after the heating step is completed.

\* \* \* \* \*